United States Patent [19]

Osawa et al.

[11] Patent Number: 4,697,212
[45] Date of Patent: Sep. 29, 1987

[54] METHOD AND APPARATUS FOR RECORDING A DIGITAL INFORMATION SIGNAL

[75] Inventors: Eiichi Osawa; Masato Tanaka; Mamoru Yoshizawa; Jun Nakai; Yuichi Kojima, all of Shinigawa, Japan

[73] Assignee: Sony Corporation, Tokyo, Japan

[21] Appl. No.: 705,331

[22] PCT Filed: Jun. 15, 1984

[86] PCT No.: PCT/JP84/00313
§ 371 Date: Feb. 15, 1985
§ 102(e) Date: Feb. 15, 1985

[87] PCT Pub. No.: WO85/00068
PCT Pub. Date: Jan. 3, 1985

[30] Foreign Application Priority Data

Jun. 18, 1983 [JP] Japan .................. 58-109577

[51] Int. Cl.⁴ .................. G11B 5/09; G11B 5/00
[52] U.S. Cl. .................. 360/48; 360/32
[58] Field of Search .............. 371/40, 41, 39; 360/32, 360/48

[56] References Cited

U.S. PATENT DOCUMENTS

| | | | |
|---|---|---|---|
| 4,277,807 | 7/1981 | Baldwin | 360/48 |
| 4,298,897 | 11/1981 | Arter et al. | 360/48 |
| 4,389,681 | 6/1983 | Tanaka et al. | 360/48 |
| 4,398,292 | 8/1983 | Doi et al. | 371/39 |
| 4,429,390 | 1/1984 | Sonoda et al. | 371/40 |
| 4,441,184 | 4/1984 | Sonoda et al. | 371/40 |
| 4,539,605 | 9/1985 | Hoshino et al. | 360/48 |
| 4,559,568 | 12/1985 | Watanabe et al. | 360/48 |

Primary Examiner—Vincent P. Canney
Attorney, Agent, or Firm—Lewis H. Eslinger; Alvin Sinderbrand

[57] ABSTRACT

A method of recording a digital data signal, such as an audio PCM signal, onto a recording medium in the longitudinal direction thereof, together with an apparatus which is suitable for this recording method. Even-numbered words and odd-numbered words in a digital data signal are recorded on a first track group and a second track group, respectively, which are separated from each other in the widthwise direction of a recording medium, to prevent a series of words becoming error words because of, for example, a flaw in the recording medium in the longitudinal direction thereof. The data format is changed at the input and output of a recording encoder to enable an error correction code and a recording circuit to be used in common for digital tape recorders which have different numbers of tracks, e.g., n tracks and 2n tracks. When an error correction code is recorded in such a manner that one word in the digital data signal is divided into a plurality of symbols which are formed into an error correction code, a plurality of symbols of the same word are recorded at a position at which error correlation is strong, making effective use of the error correction capacity of the error correction code.

6 Claims, 17 Drawing Figures

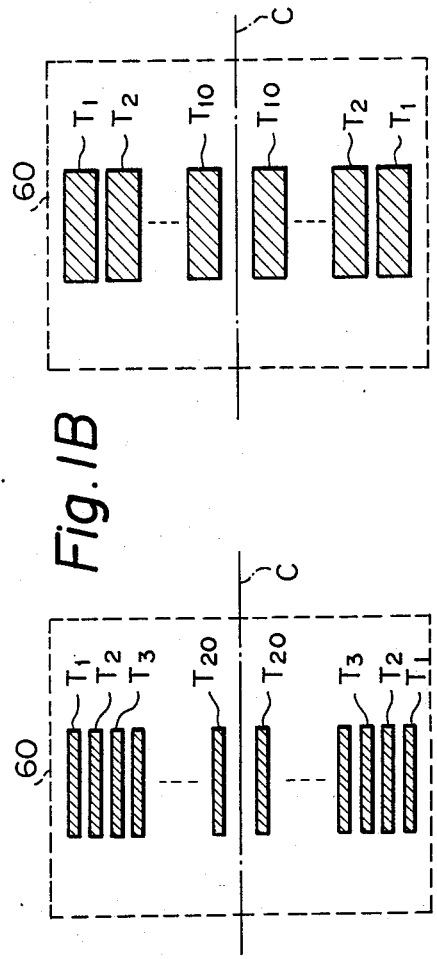
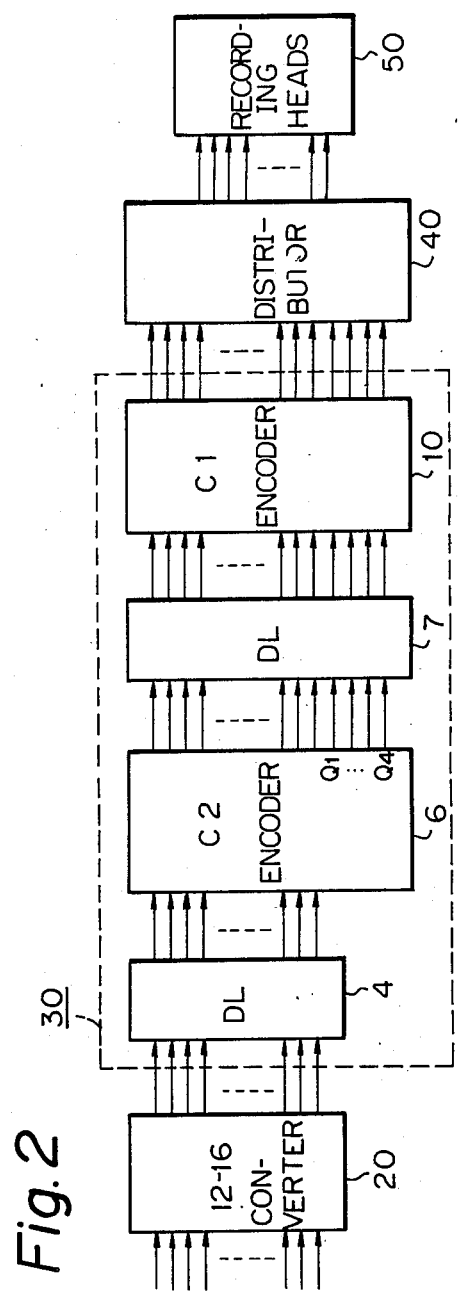
Fig.1A
Fig.1B
Fig.2

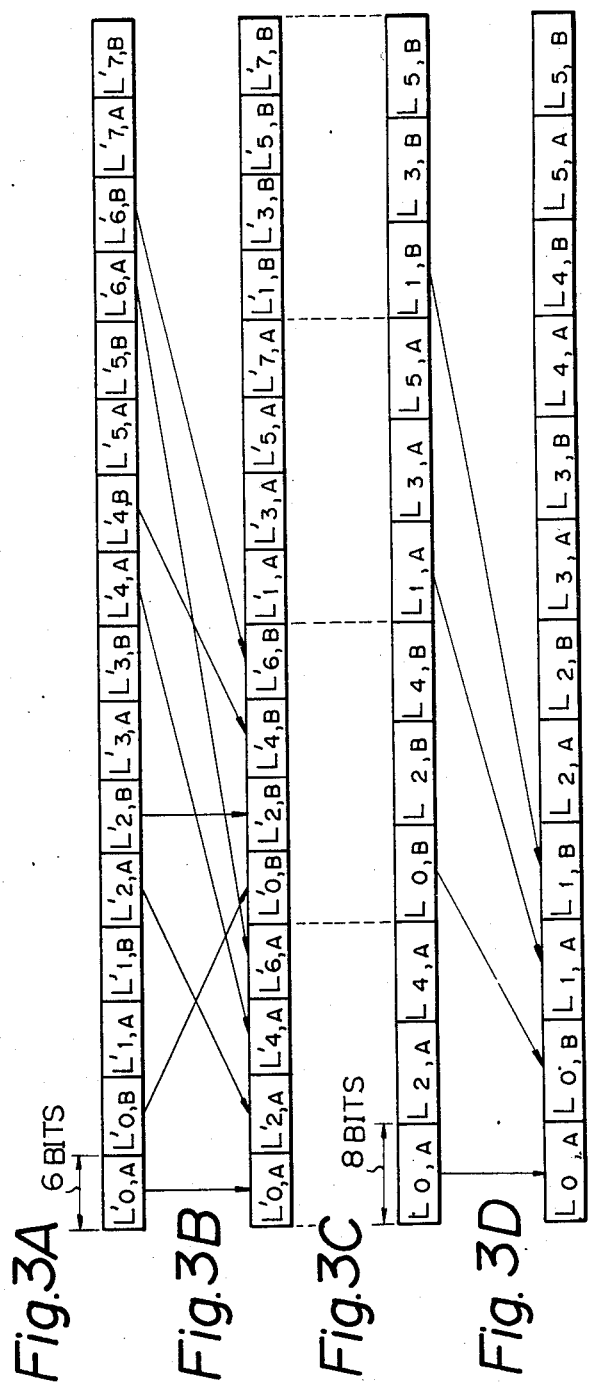

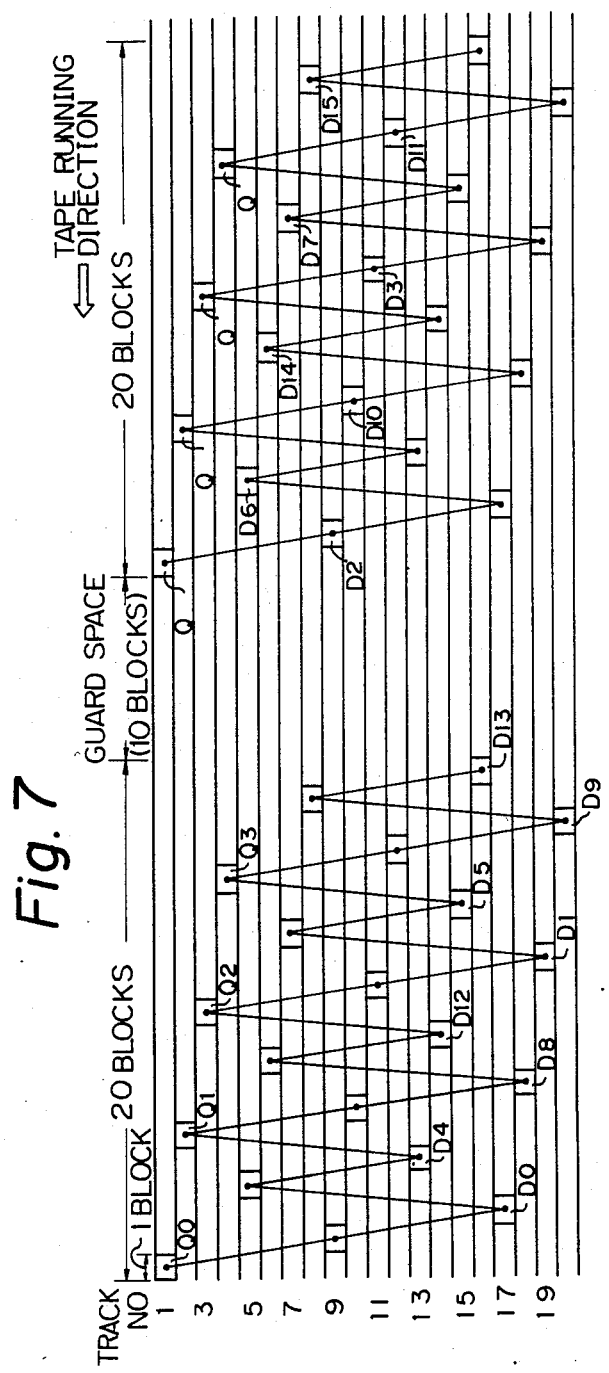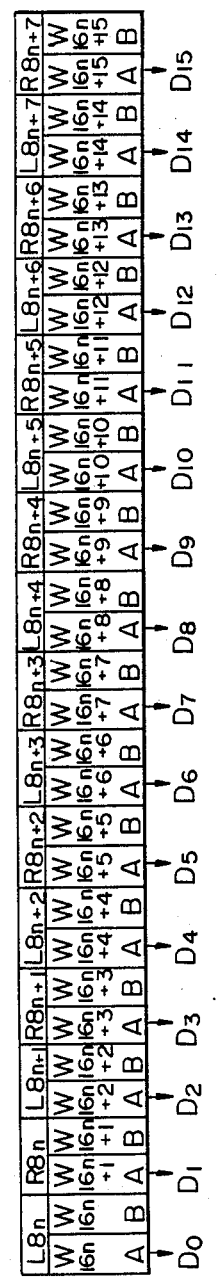
Fig. 7
Fig. 8

METHOD AND APPARATUS FOR RECORDING A DIGITAL INFORMATION SIGNAL

TECHNICAL FIELD

The present invention relates to a method and an apparatus for recording a digital information signal which are suitable for use in the recording of a digital information signal such as an audio PCM signal or the like on a recording medium, particularly, on a magnetic tape.

BACKGROUND ART

There has been considered a digital tape recorder which records an audio PCM signal as parallel multi-tracks on a magnetic tape enclosed in a cassette casing by fixed heads. In case of recording and reproducing the audio PCM signal on and from the multitracks, there is a case where a fairly long burst error is generated in the reproduced signals from the adjacent few tracks which are included in a part of width of the magnetic tape. This phenomenon is caused due to scratches in the longitudinal direction of the magnetic tape or unstable contact between the magnetic tape and the magnetic heads due to the defective magnetic tape running system. When this burst error exceeds the correcting capability of the error correction codes which are used, the erroneous words are concealed.

As an error concealment, a method of interpolating by the mean value of the values of the correct words before and behind the erroneous word is used. However, if the correct words do not exist before and behind the erroneous word due to a long burst error, the mean value interpolation cannot be used. In such a case, the reproduced audio signal is subjected to preceding value holding or the muting.

As a digital tape recorder of such a multitrack type, there has been considered a recording method whereby the 16-bit linear quantized two-channel audio PCM signal derived at a sampling rate of 44.1 kHz is recorded at about 1.4M bits/second on twenty tracks of the magnetic tape which is running at a tape speed of 4.76 cm/sec.

There has been considered another recording method whereby the 16-bit linear quantized two-channel audio PCM signal in the sampling rate of 48 kHz is recorded as the recording data of about 1.8M bits/second on twenty tracks of the magnetic tape which is running at a tape speed of 5.18 cm/sec (hereinafter, referred to as a 2M mode). Further, another method has been considered whereby the 12-bit non-linear quantized two-channel audio PCM signal derived by a lower sampling rate of, for example, 32 kHz is recorded on the magnetic tape at about 0.9M bits/second so as not to substantialy cause any trouble in the recording and reproduction in the audible frequency band (hereinafter, referred to as a 1M mode).

These recording methods are set in accordance with the particular end use or the like. In 1 recording method called the 1M mode, the amount of data which is recorded is one half as compared with that in another recording mode called the 2M mode, in which the number of tracks of recorded data is selected as 20, the tape speed can be reduced to half (2.6 cm/sec) of the 2M mode, thereby enabling a longer recording time to be obtained. On the contrary, if the tape speed is set to be equal to that in the 2M mode, the same amount of data can be recorded on the ten tracks. If the number of tracks is reduced to half, the track pitch can be doubled. Therefore, this makes it possible to easily manufacture multitrack heads and to easily perform the tracking operation upon reproduction. It is considered that this recording method using the 10-tracks in the 1M mode will come into wide use before the recording method using the 20-tracks. However, when superiority of the performance of the 20-tracks type is considered, there is a risk such that the 10-tracks type will have been neglected as an old-fashioned method.

Therefore, it is a requirement that the magnetic tape recorded by the 1M-mode method using ten tracks can be compatibly reproduced by the 2M-mode tape recorder using twenty tracks. This compatibility is needed to be satisfied as well even with respect to not only the track pattern but also the error correction codes.

Generally, in case of performing the error correction encoding process, if one symbol consists of a number of information bits, the encoding circuit becomes complicated and the time required for the encoding process becomes long. Therefore, one word (for example, 16 bits) is divided into the most significant eight bits and the least significant eight bits, and the error correction codes, e.g., Reed Solomon codes are constituted using these eight bits as one symbol.

In case of recording one word by dividing it into the symbols each consisting of eight bits in this way, it is necessary that both two symbols forming the same single word are the correct data upon reproduction. Even if one of these two symbols is the correct data, when the other symbol is the erroneous data, the correct one word cannot be obtained. Thus, it is generally required that the symbols forming the same word are included in a common series of error correction codes. However, in the case where the interleving process is also performed for improvement of the error correcting capability, the recording positions of these two symbols become a weak error correlation, such as being in separate tracks. Thus, there is practically a problem such that only one of the two symbols forming a word is found to have an error.

DISCLOSURE OF INVENTION

The present invention relates to a method and an apparatus for recording a digital information signal in which even when a long burst error, which exceeds the correcting capability of the error corrrection codes which are used, is caused in the reproduced signals from a few adjacent tracks, this error can be corrected. Namely, in this invention, with regard to the time sequence of the digital information signal, a plurality of even-numbered words and a plurality of odd-numbered words are specified so as to be recorded respectively on the first track group and the second track group which are separated with respect to the direction of a width of a recording medium, and the error correction encoding process is performed with regard to each of the plurality of even-numbered words and the plurality of odd-numbered words. Therefore, even in case of a long burst error which is generated due to scratches in the longitudinal direction of the magnetic tape, or defective contact between the magnetic tape and the magnetic heads which is due to the turn-over or cupping of the magnetic tape, or the like, the erroneous word can be interpolated by the mean value of the correct words adjacent to the erroneous word.

On the other hand, in this invention, in the case of recording a digital information signal on n tracks which are parallel each other on the recording medium, error detection and correction encoding processes are performed with respect to the input information to produce outputs which can be distributed onto 2n tracks, and these outputs are converted to the data which can be recorded on the n tracks. The invention is provided with encoding means for 2n tracks and distributing means for time-shared multiplexing the outputs of the encoding means onto the n tracks, so that the error correction codes can be unified for both 2n-track mode and n-track mode. Therefore, the hardware can be commonly used and further, the recorded tape in the n-track mode can be compatibly produced in the 2n-track mode. Also, even if data is recorded in the n-track mode, a strong error correcting capability can be derived.

Further, the invention relates to a method and an apparatus for recording a digital information signal in which the probability that a plurality of symbols constituting the same word are erroneous is raised and the correcting capability of the error correction codes can be maximized. For example, when dividing one word of the digital information signal into a plurality of symbols so as to be recorded, the plurality of symbols constituting this one word are recorded at positions having a strong error correlation. Namely, when one word is divided into two symbols these symbols are recorded in the adjacent portions on the same track by using a digital tape recorder of the multitrack type. In a case differing from this invention, if these symbols are recorded in different tracks, this will result in the case where the error correlation becomes weak due to the guard band between the tracks, so that only one symbol error causes one word error. On the contrary, in this invention, a probability such that two symbols together become the erroneous symbols can be raised, so that it is possible to make the most of the correcting capability of the error correction codes.

BRIEF DESCRIPTION OF THE DRAWINGS

FIG. 1 consisting of 1A and 1B is a tape pattern diagram showing track arrangements in the 20-tracks mode and 10-tracks mode in a digital audio tape recorder;

FIG. 2 is a block diagram showing the main part of a recording system of a digital tape recorder showing one embodiment of the present invention;

FIG. 3 consisting of 3A through 3D is a data format diagram showing a data process in a 12–16 converter in FIG. 2;

FIGS. 6 to 8 are schematic diagrams which are used for explaining a recording format in case of the 20-tracks mode;

BEST MODE FOR CARRYING OUT THE INVENTION

Figure 4A:
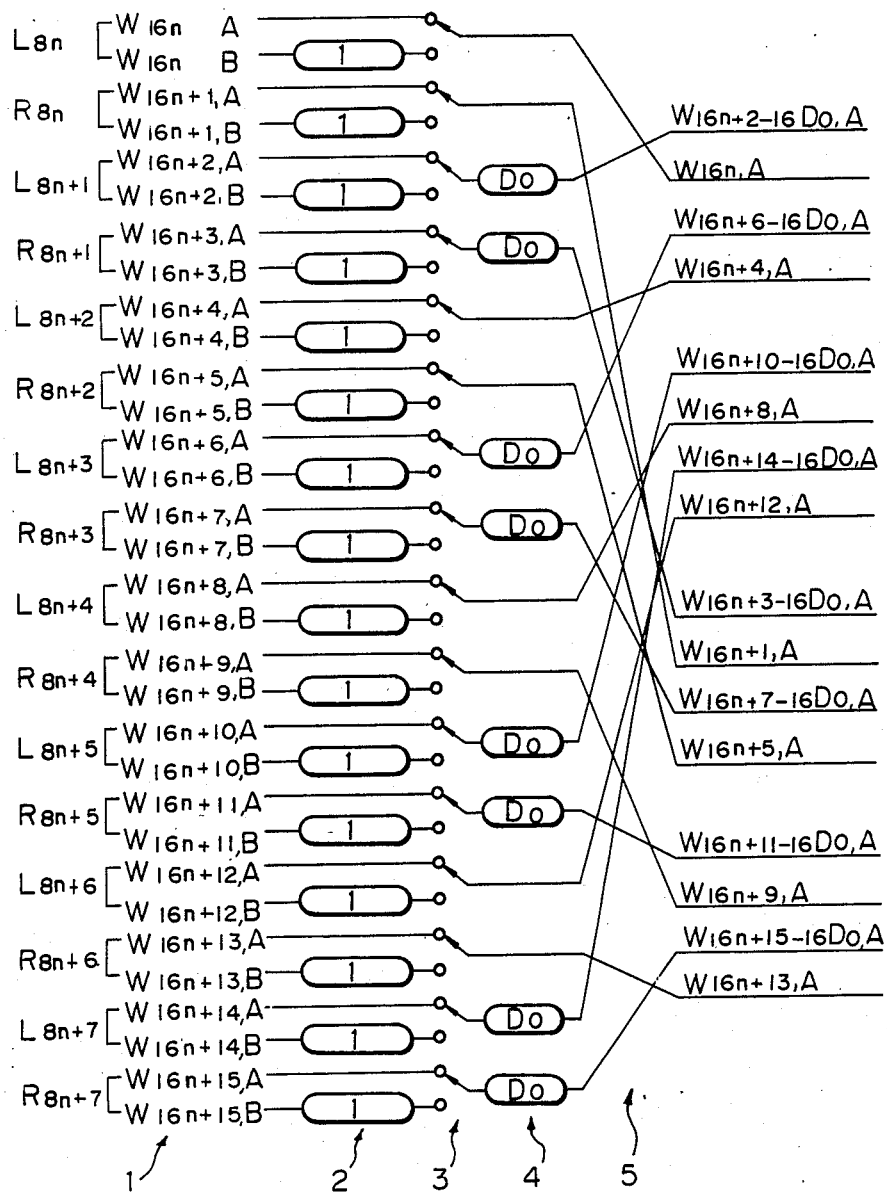
FIG. 4 consisting of 4A through 4D is a block diagram showing an encoding section and a track distributor in FIG. 2.

One embodiment in the case where the present invention is applied to a digital tape recorder will now be described hereinbelow with reference to the drawings.

FIG. 1A shows an arrangement of tracks of a digital tape recorder which can selectively record on and reproduce from twenty tracks, respectively. Tracks in the forward path are formed at positions indicated at T1, T2, ..., T20 in one of the areas of a magnetic tape 60 divided by a longitudinal center line C by means of twenty thin film heads arranged in the widthwise direction of the magnetic tape in correspondence to the twenty tracks. By reversing a tape cassette, tracks in the backward path are symmetrically formed in the other area relative to the center line C.

FIG. 1B shows an arrangement of tracks of a digital tape recorder which can selectively record on and reproduce from ten tracks. As shown in FIG. 1B, a track width and track pitch are approximately twice as large as those in case of twenty tracks, so that the degree of accuracy regarding the locations where the magnetic heads are attached and the degree of tracking accuracy may be reduced.

In this case, assuming that a digital information signal is recorded in the track arrangement shown in FIG. 1B, in order to enable the magnetic tape so recorded to be also reproduced by a tape recorder having the track arrangement shown in FIG. 1A, the locations in both track arrangements must be aligned.

FIG. 2 is a block diagram showing an overall recording circuit in which a two-channel audio PCM signal of non-linearly quantized twelve bits in a sampling rate of 32 kHz is supplied to this recording circuit. This audio PCM signal is supplied to an encoding section 30 through a 12-16 converter indicated at 20. Outputs of the encoding section 30 are supplied to a track distributor 40. Recording data corresponding to ten tracks are outputted from the track distributor 40 and are recorded on the magnetic tape by recording heads 50. This encoding section 30 is the same as the encoding section which would be used if recording on twenty tracks. The error correcting processes in the 1M and 2M modes are the same.

The 12-16 converter 20 divides the 12-bit input data into the 16-bit time slots and can process the 12-bit input data in a similar manner as the 16-bit quantized data at the sampling rate of 48 kHz, which is the desired input to the encoding section 30. The track distributor 40 serves to distribute the output data of twenty tracks, which were processed in the encoding section 30, to the recording heads 50 of ten tracks. This track distributor 40 is, for example, a buffer memory and converts data which should be recorded on two tracks to data which can be recorded together on one track.

The encoding section 30 performs the error correction coding of, e.g., CIRC codes (cross interleaved Reed Solomon codes). Namely, the encoding section 30 is constituted by delay element group 4 for performing the even-odd interleaving and a C2 encoder 6 and delay element group 7 for performing the interleaving and a C1 encoder 10.

The converting process of the 12-16 converter 20 will now be described with reference to FIG. 3, in which line A shows a series of two symbols (indicated together with suffixes A and B) each of which has six bits and which are obtained by dividing each of the words (12 bits) $L'_0, L'_1, \ldots, L'_7$ of the audio PCM signal in one channel into two parts. This data series is combined into sets each consisting of four symbols which as shown in line B of FIG. 3 are four even numbered words and which have the suffixes of A or B. These sets, each having four symbols, have a length of 24 bits as a whole are respectively constituted by the symbols included in the even numbered words and all having the same suffixes of, A or B. The odd numbered words are likewise combined into sets, each of which consists of four symbols and have a length of 24 bits.

As shown in line C of FIG. 3, these sets (24 bits) each consisting of four 6-bit symbols are converted into sets each consisting of three eight-bits symbols. More specifically, 24 bits are divided into three parts each consisting of eight bits and each part can be regarded as an 8-bit symbol. As shown in line D of FIG. 3, these 8-bits symbols ($L_{0,A}$; $L_{2,A}$; ...; $L_{5,B}$) after conversion are rearranged back into the original sequence and are inputted to the encoding section 30. The execution of this bit conversion enables the even-odd interleaving to be performed just as in the case where one word consists of sixteen bits, thereby preventing reduction of the error correcting capability. The C2 encoder 6 performs the encoding process of the error correction codes C2 for every 16 symbols. Since the foregoing bit conversion is carried out on a three-symbol unit basis, a fraction of one symbol is caused. However, since the information symbols in one block consist of 480 symbols, this fraction is not forced out of one block. Therefore, this makes it possible to prevent the processing cycle from becoming too long by preventing the decoding of the results of adjacent blocks.

FIG. 4 shows a detailed arrangement of the encoding section 30. FIG. 4A shows the input side and the signal processes are performed in accordance with the sequence of FIG. 4B, FIG. 4C and FIG. 4D.

In FIG. 4A, a reference numeral 1 denotes input symbols of the audio PCM signal to be recorded. Each of eight words per each channel; namely, ($L_{8n}$, $L_{8n+1}$, ..., $L_{8n+7}$ in the left channel) and ($R_{8n}$, $R_{8n+1}$, ..., $R_{8n+7}$ in the right channel) is divided every two symbols, and the total 32 symbols are synchronously inputted. As shown in FIG. 4A, the symbols of $W_{16n+i}$ (where, i=0, 1, 4, 5, 8, 9, 12, 13) denote the symbols of the even-number designated words. And the symbols of $W_{16n+j}$ (where, j=2, 3, 6, 7, 10, 11, 14, 15) indicate the symbols of the odd-number designated words. In addition, the symbols to which the suffix A is added denote the most significant 8-bits of one word. The symbols to which the suffix B is added represent the least significant 8-bits of one word.

The above-mentioned input symbols are supplied to a delay element group 2. This delay element group 2 is constituted by sixteen delay elements for delaying only the symbols with the suffix of B. The outputs the delay element group 2 are supplied to a switching circuit 3. The switching circuit 3 alternately selects the inputted 16 symbols having the suffix A and the 16 symbols having the suffix B, which were delayed by one symbol amount and outputs the selected symbols, thereby permitting the C2 encoder that is the following stage to operate on a time-sharing basis.

The outputs of the switching circuit 3 are supplied to the delay element group 4. The delay element group 4 supplies the symbols $W_{16n+i,A}$ or $W_{16n+i,B}$ of the even-numbered words to the C2 encoder 6 (FIG. 4B) without being delayed, and meanwhile it supplies the symbols $W_{16n+j,A}$ or $W_{16n+j,B}$ of the odd-numbered words to the C2 encoder 6 after being delayed by amount of $D_0$. Due to this delay element group 4, the symbols of the even-numbered words and the symbols of the odd-numbered words which are adjacent each other are recorded at the positions which are away from each other by an amount $D_0$ in the longitudinal direction of a magnetic tape. This process is referred to as even-odd interleaving in the longitudinal direction. The amount of delay $D_0$ is selected to be, for example, equal to a length of 900 symbols.

Figure 4B:
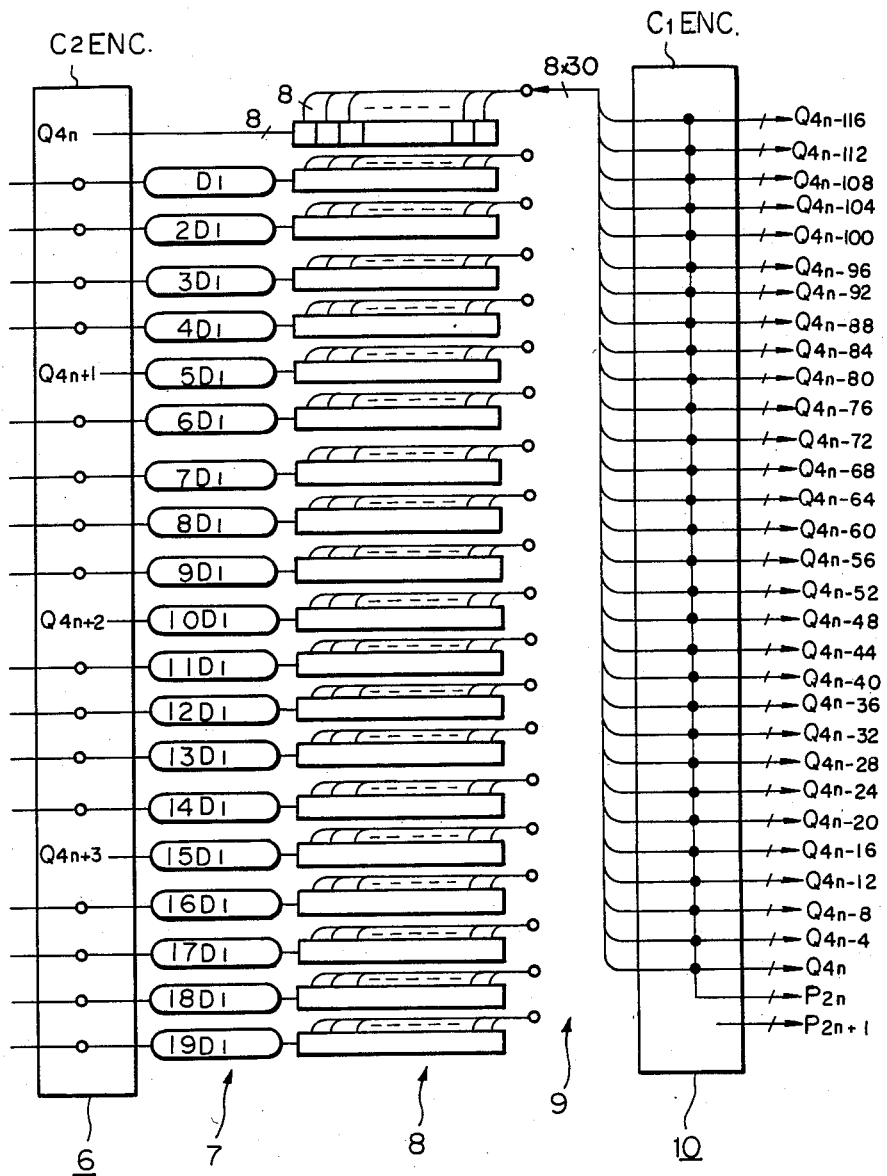

Signal lines 5 as the outputs of the delay element group 4 are exchanged and connected to the C2 encoder 6. After the signal lines 5 are exchanged, the symbols of the odd-numbered words and the symbols of the even-numbered words are also alternately located. FIG. 4B shows sixteen symbols input to the C2 encoder 6 in which only symbols having the suffix A are selected by the switching circuit 3.

The C2 encoder 6 serves to perform the encoding process of the (20, 16) Reed Solomon codes C2. The C2 encoder 6 outputs twenty symbols consisting of four parity symbols of $Q_{4n}$, $Q_{4n+1}$, $Q_{4n+2}$, and $Q_{4n+3}$ and sixteen information symbols. In the (20, 16) Reed-Solomon Code 2 the distance between the error correction codes C2 on the Galois field is (d=5). On the other hand, the outputs of the C2 encoder 6 are constituted in a manner such that the parity symbols $Q_{4n}, \ldots, Q_{4n+3}$ are respectively arranged before every four information symbols.

The outputs of the C2 encoder 6 are supplied to the delay element group 7 as shown in FIG. 4B. Assuming that a unit delay amount is $D_1$, the delay element group 7 delays each of the twenty symbols by each of the delay amounts of 0, $D_1$, $2D_1$, ..., and $19D_1$ such that these delay amounts are increased sequentially by $D_1$. Due to this delay element group 7, the twenty symbols forming the same code series from the C2 encoder 6 are interleaved so as to be recorded with the distance of $D_1$ in the longitudinal direction of the magnetic tape. The amount of delay $D_1$ is selected to be, for example, equivalent in length to 30 symbols.

The outputs of the delay element group 7 are supplied to a shift register circuit group 8. The shift register circuit group 8 has twenty shift registers of (8 bits×30 stages), in which each stage has eight parallel output lines. The parallel outputs of the shift register circuit group 8 are supplied to the C1 encoder 10 through a switching circuit 9. The switching circuit 9 sequentially selects the thirty symbols stored in each of the twenty shift registers and supplies them to the C1 encoder 10.

In this embodiment, the 30 symbols fetched from each shift register are included in one block and the encoding process of the error correction codes C1 is performed on this block unit basis, in which (32, 30) Reed Solomon codes are used as the error correction codes C1. The distance between the error correction codes C1 on the Galois field is (d=3). At the outputs of the C1 encoder 10, 32 symbols including two parity symbols (indicated by P) appear. The symbols shown in FIG. 4B are generated when the switching circuit 9 selects, as illustrated, the outputs of the shift registers in which parity symbols $Q_{4n}, Q_{4n-4}, \ldots, Q_{4n-116}$ are stored.

Figure 4C:
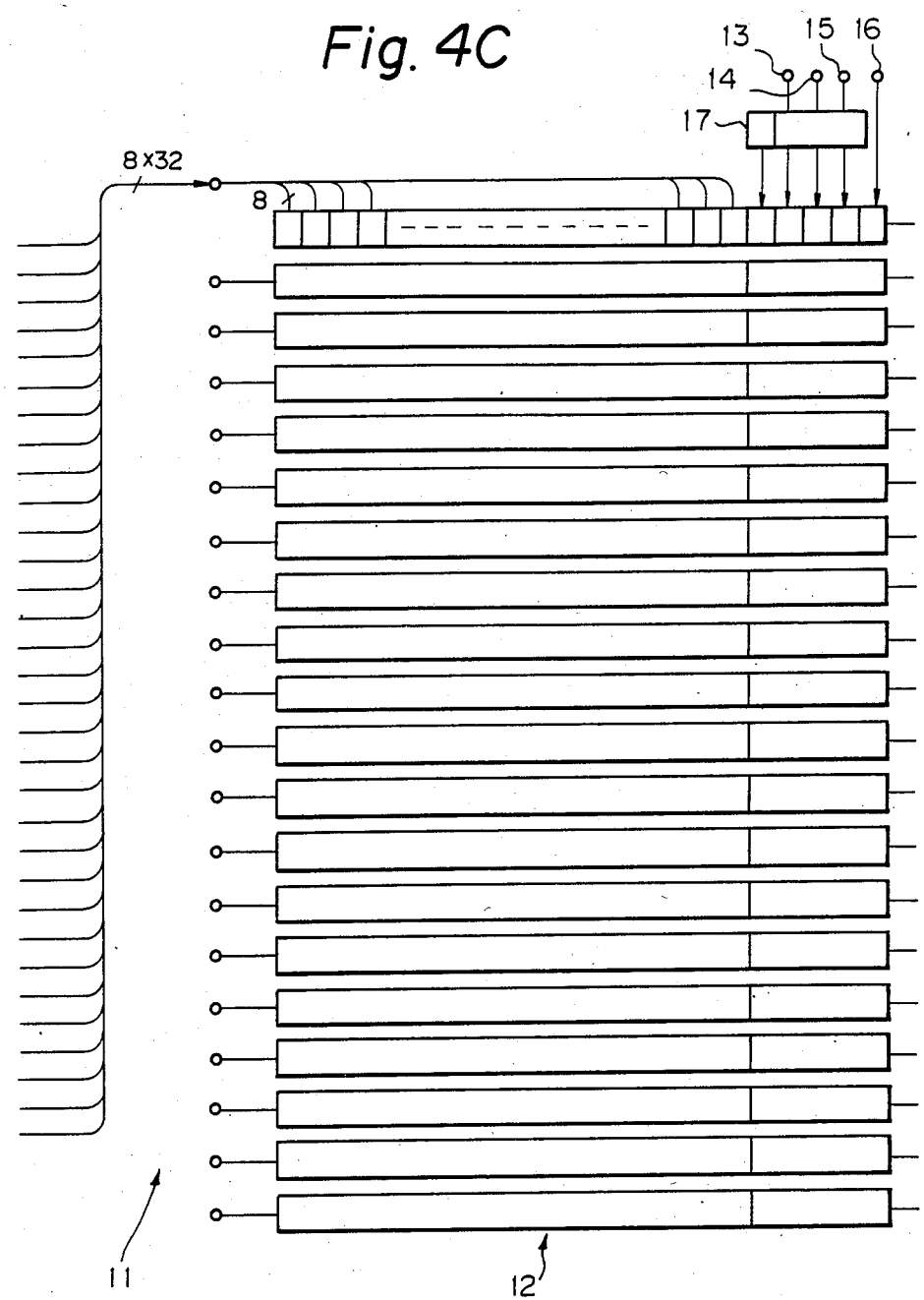

The 32 symbols which are outputted from the C1 encoder 10 are supplied to a shift register circuit group 12 through a switching circuit 11 as shown in FIG. 4C. The shift register circuit group 12 has twenty shift registers of (8 bits×32 stages+32 bits). Namely, each shift register in the shift register circuit group 12 has 288 bits which are equal to the length of one block. The parallel inputs for adding a block sync signal and the like are supplied to the 32 bits which are first fetched as the serial output of the shift register. FIG. 4C shows an arrangement for this addition with respect to only one shift register; arrangements regarding the others are omitted in the diagram.

Figure 5:
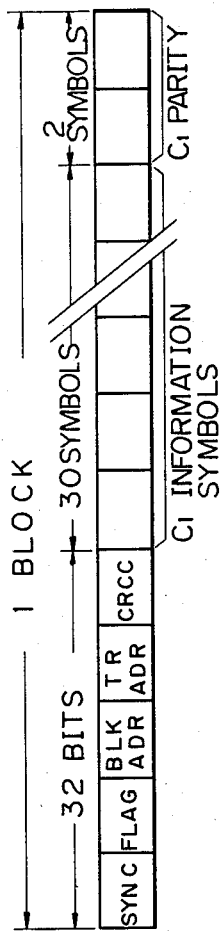
FIG. 5 is a schematic diagram showing an arrangement of one block of a recording data.

A flag signal indicative of the control information necessary for process of data in each block or each track is supplied to a terminal 13. For instance, the flag signal indicates the number of bits of a sampled word, sampling frequency, on/off of pre-emphasis, auto-reverse mode or not, discrimination of the 30-track mode or 10-track mode, discrimination of two channels or four channels, and the like of the audio PCM signal recorded. Track addresses representative of track numbers are supplied to a terminal 14. Block addresses are supplied to a terminal 15 and a block sync signal is supplied to a terminal 16. These flag signal, track addresses and block addresses are supplied to the shift registers and a CRC encoder 17, so that the encoding process for error detection is performed. The redundant code (called the CRC code) of these CRC codes is also supplied to the shift registers. FIG. 5 shows a data arrangement of one block which is serially outputted from each shift register in the shift register circuit group 12.

The 8-bit block sync signal is arranged at the beginning of one block, then the 4-bit flag signal, 2-bit track address, 8-bit block address, and 12-bit CRC code are arranged sequentially, with number thereof being 34 bits. The track address may serve to discriminate a few adjacent tracks. After these 32 bits, thirty information symbols (240 bits) are located. Two symbols of the paritys P of the error correction codes C1 for these information symbols are arranged at the last in the one block. The data is recorded on the magnetic tape using this one block (288 bits) as a unit.

Figure 4D:
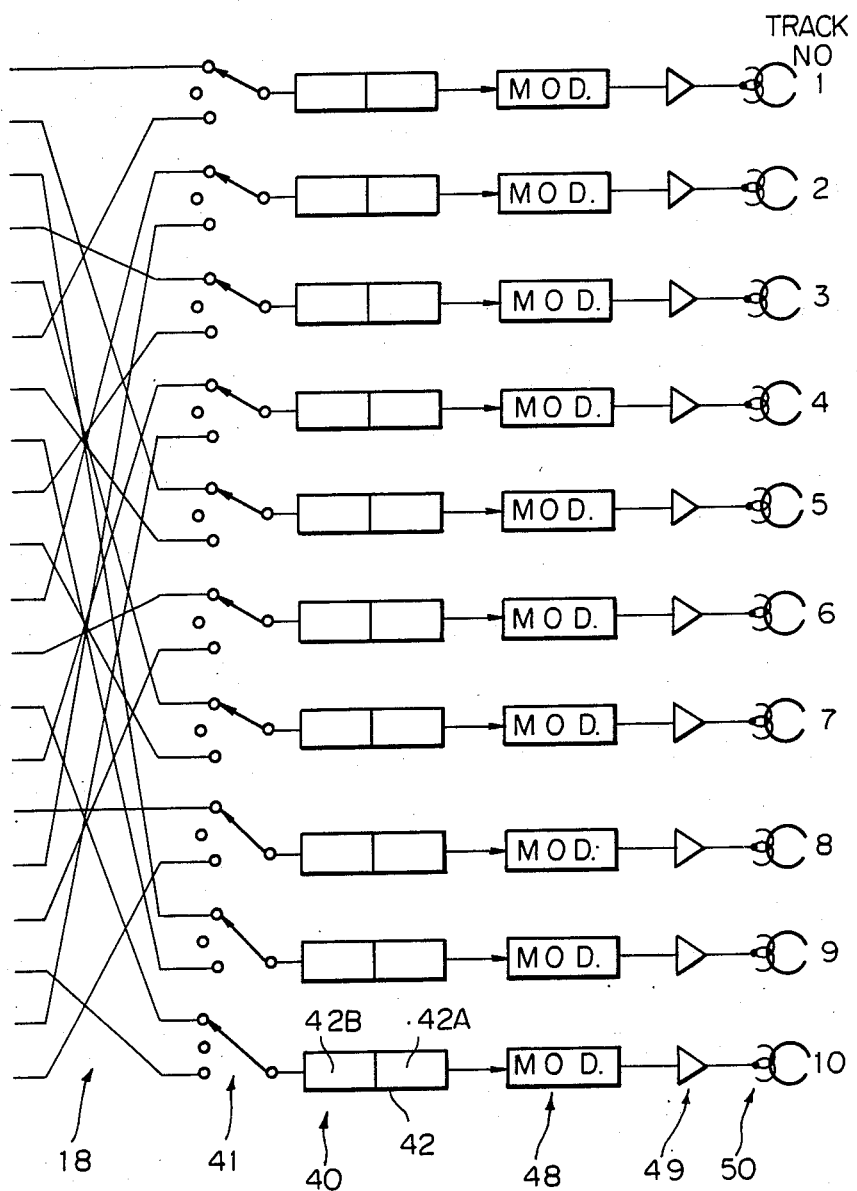

As shown in FIG. 4D, signal lines 18 led from the respective shift registers in the foregoing shift register circuit group 12 are subjected to rearranging and are supplied to a recording circuit. In the tape recorder having twenty tracks (see FIG. 1A), the above signal lines 18 are supplied directly to the channel encoder after they were exchanged. However, because this embodiment relates to the tape recorder of the ten-tracks (see FIG. 1B) the outputs of the signal lines 18 must be first time-shared multiplexed by the track distributor 40 so as to have the proper number of outputs for the ten tracks.

That is, the outputs of the adjacent two signal lines are combined to one. The track distributor 40 consists of switching circuits 41 and buffer memories 42. Each switching circuit 41 selects the signals which are on the adjacent odd-numbered and even-numbered signal lines 18 in accordance with the transmission timing of the shift register circuit group 12, thereby allowing them to be sequentially stored into a front stage section 42A and a rear stage section 42B of each buffer memory 42. The contents of these front and rear stage sections 42A and 42B are serially outputted and supplied to a channel encoder or modulator 48 corresponding to each track. The channel encoder 48 has ten digital modulators which are equal in number to the number of tracks to be recorded. The outputs of the channel encoder 48 are supplied to the recording heads 50 through a recording amplifier group 49. The recording heads 50 are constituted by, for instance, thin film magnetic heads having ten gaps corresponding to the tracks respectively. The recording is performed on ten tracks which are numbered sequentially from the upper edge of the magnetic tape.

Although in this embodiment the above-mentioned delay processes, exchanging processes of the signal lines, processes in the shift registers in the encoding section 30, and time-shared multiplexing processes by the switching circuits 41 and buffer memories 42 are described as being carried out by discrete circuit components, the necessary functions could also be executed by a random access memory (RAM), which is controlled by a microprogram.

The foregoing encoding processes will then be described while comparing the 20-track mode with the 10-track mode. The data which is fetched on the signal lines 18 as the outputs of the shift register circuit group 12 in the 20-track mode is fundamentally the same as the data appearing as the outputs of the C2 encoder 6 if the interleaving in the longitudinal direction of the tape by the delay element group 7 is ignored. More specifically, when the twenty signal lines 18 are numbered sequentially from the top, the parity symbols Q of the error correction codes C2 are fetched on the respective 1st, 6th, 11th, and 16th signal lines, and the symbols of the even numbered words are fetched on the respective eight 3rd, 5th, 8th, 10th, 13th, 15th, 18th, and 20th signal lines. Further, the symbols of the odd numbered words are fetched on the respective 2nd, 4th, 7th, 9th, 12th, 14th, 17th, and 19th signal lines.

On the other hand, by interchanging those signal lines 18 it permits the case of the 20-track mode shown in FIG. 7, the parity symbols Q of the error correction codes C2 to be recorded on the 1st to 4th tracks near the upper edge, and the symbols of the odd numbered words to be recorded on the next 5th to 12th tracks, and the symbols of the even numbered words to be recorded on the 13th to 20th tracks near the lower edge.

In this way, by exchanging the signal lines 18, the symbols of the odd numbered words are recorded on the eight tracks located on the upper side in the direction of a width of the magnetic tape, while the symbols of the even numbered words are recorded on the eight tracks located on the lower side. Thus, the even-odd interleaving in the longitudinal direction can be performed. Since the parity symbols Q are redundant data that have lower significance than the information data, they have recorded on the tracks near the edge where errors easily occur due to the turn-over, damage or the like of the edge.

Figure 6:
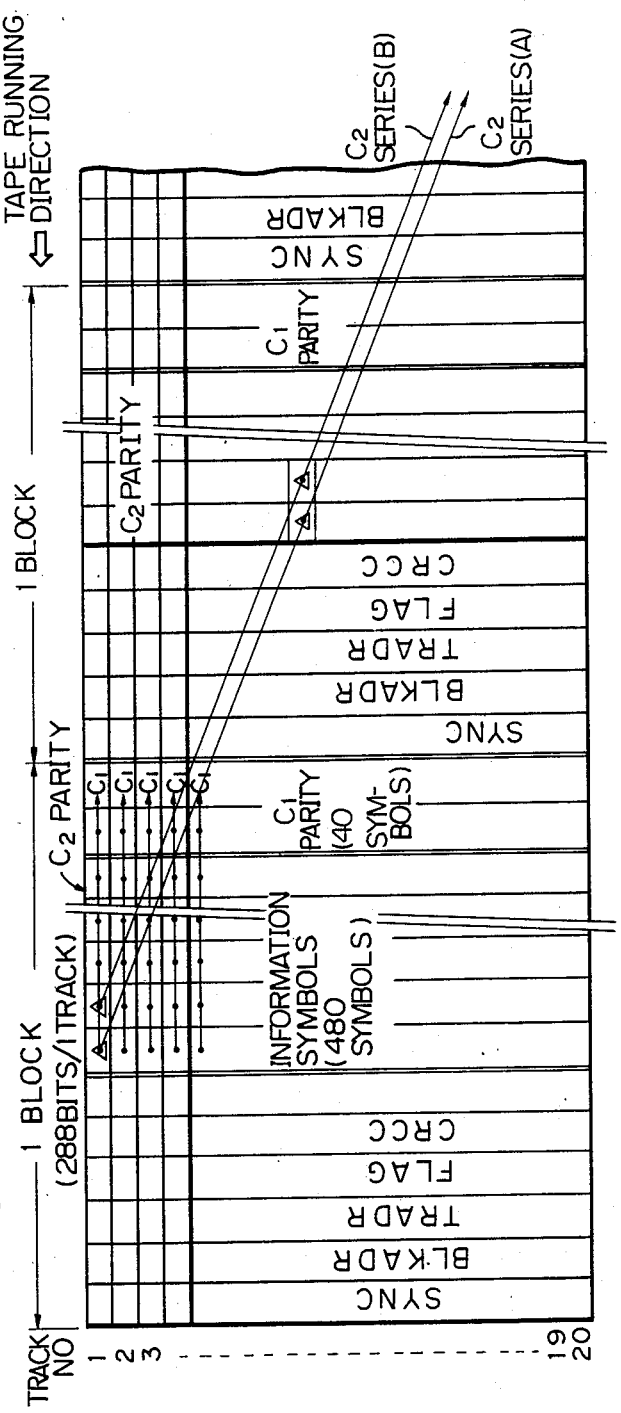

FIG. 6 shows the data recorded on the magnetic tape. The encoding process of the error correction codes C1 is performed for every one block of the C2 parity symbols and the information symbols, with the C1 parities P of two symbols being added thereto. Therefore, twenty blocks arranged in the direction of a width of the tape are constituted by the C2 parities Q of (30×4=120 symbols), information symbols of (30×16=480 symbols) and C1 parities P of (2×20=40 symbols).

On the other hand, since two symbols constituting one word are delayed by amount of one symbol by the delay element group 2, these two symbols are recorded as adjacent symbols in the same block. The error correction encoding processes are performed for the sixteen symbols having the suffix of A and for the sixteen symbols having the suffix of B, respectively. In FIG. 6, a C2 series (A) and a C2 series (B) as indicated by oblique lines are produced. For example, in FIG. 6, four symbols indicated by Δ are ($Q_{4n}$; $Q_{4n+4}$; $W_{1616n+2-16D0,A}$; $W_{16n+2-16D0,B}$). The $Q_{4n}$ and $W_{16n+2-16D0,A}$ are included in the C2 series (A) and the other two symbols are included in the C2 series (B).

As shown in FIG. 8, when it is assumed that the 16 symbols with the suffix of A among the 32 symbols corresponding to the eight successive words per channel of the audio PCM signal are represented by $D_0$, $D_1$, ... $D_{15}$, respectively, are these 16 symbols recorded on the magnetic tape at the locations shown in FIG. 7. The symbols of the odd-number designated words are delayed by the delay element group 4 (unit delay amount is $D_0$) in the encoding section 30, so that the symbols $D_j$ (j=2, 3, 6, 7, 10, 11, 14, 15) of the odd-number designated words are recorded at positions behind the even-numbered words designated by the symbols $D_i$ (i=0, 1, 4, 5, 8, 9, 12, 13). In this embodiment, the time difference $D_0$ between them is set to thirty blocks.

Due to the exchanging of the signal lines 5, the lines connecting the twenty symbols which form the common C2 series (A) become the folded lines as shown in FIG. 7. In the two C2 series (A) as illustrated, the symbols to which the signs of the symbols $D_i$ and $D_j$ are not added denote the other symbols which are outputted from the delay element group 4. One C2 series (A) is distributed so as to be recorded in the intervals corresponding to twenty blocks in the longitudinal direction of the tape. Therefore, the guard space corresponding to ten blocks in the longitudinal direction of the tape is interposed so that the even-odd interleaving is performed in the longitudinal direction of the tape on which the sets of the symbols $D_i$ and the sets of the symbols $D_j$ are recorded.

Due to the exchanging processes of the signal lines 18, the parities Q of the C2 series are recorded on the 1st to 4th tracks, the symbols $D_j$ recorded on the 5th to 12th tracks, the symbols $D_i$ are recorded on the 13th to 20th tracks, and the interleaving in the direction of a width is performed. Thus, the C2 series (B) which is formed by the symbols to which the suffix of B is added as shown in FIG. 8 can be represented by parallel folded lines after one symbol of the C2 series (A) shown in FIG. 7. FIG. 6 shows, therefore, a concrete diagram of the first two blocks passed by those parallel folded lines as shown in FIG. 7 and especially tracks numbered 1 to 4.

Figure 9:
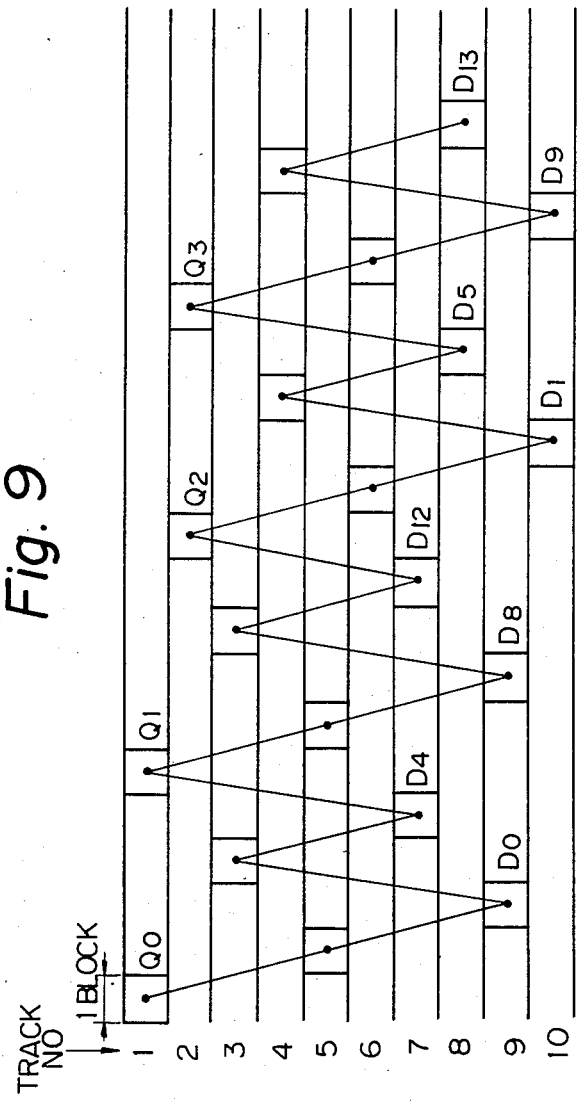
FIG. 9 is a schematic diagram showing a recording format in case of the 10-tracks mode corresponding to FIG. 7.

In the tape recorder having ten tracks in the 1M mode, as described before, the twenty outputs of the encoding section 30 are subjected to the time-shared multiplexing processes by the track distributor 40 and are recorded on the ten tracks. Therefore, the data is recorded in a recording pattern as shown in FIG. 9, such that the tracks with the recording pattern of FIG. 7 are thinned out every other track and the data $Q_1$, $Q_3$, $D_8$, $D_9$, and the like included in these thinned out tracks are shifted, respectively, onto the tracks just preceding those tracks. Namely, the data existing on the 2ith (i=1, 2, ..., 10) tracks may be shifted onto the (2i−1)th (i=1, 2, ..., 10) tracks and the (2i−1)th tracks may be numbered like (i=1, 2, ..., 10).

FIG. 9 shows the C2 series (A) which is formed by the even-numbered words of the symbols to which the suffix A is added as shown in FIG. 8. The C2 series (A) by the symbols of the odd-numbered words is formed after thirty blocks similarly to FIG. 7, although it is not shown. Consequently, even in this embodiment of the ten-tracks pattern, the even-odd interleaving in the widthwise direction of the tape and the even-odd interleaving in the longitudinal direction of the tape are carried out.

The data recorded on the ten tracks in the 1M mode is reproduced from the magnetic tape 60 and is supplied to a data arrangement converter through a reproducing amplifier and a channel decoder. The data format of this data corresponding to the ten tracks is converted to the data corresponding to the twenty tracks. The converted data is supplied to a reproducing decoder for performing the processes opposite to those in the encoding section 30. This reproducing decoder has the same arrangement as the reproducing decoder which is used in the digital tape recorder of the twenty tracks in the 2M mode, so that it performs the error correcting and deinterleaving processes with respect to the data corresponding to the twenty tracks. Since the two error correction codes C1 and C2 are employed the error correcting operation or error detecting operation is first executed by means of the error correction codes C1. The error correction by the error correction codes C2 is performed using an error pointer indicative of the result of this error detection. The erroneous words including the symbols which cannot be error-corrected are subjected to the mean value interpolation by the error correcting circuit. These processes are quite the same with regard to both digital tape recorders having ten and twenty tracks.

Figure 10:
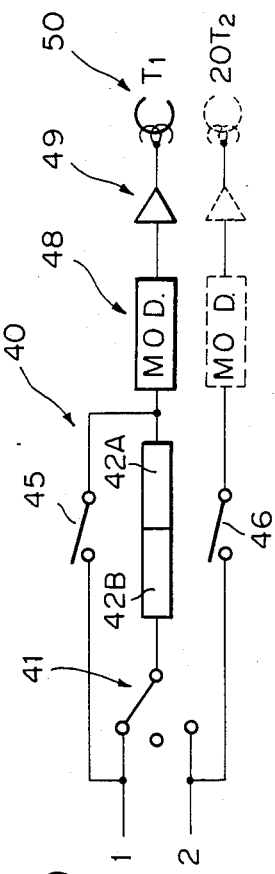
FIG. 10 is a block diagram showing an example of an arrangement of the track distributor.

The principal part of the hardware in the digital tape recorder in the 10-track mode in this embodiment is common to that of the digital tape recorder of the 20-track mode. Therefore, as shown in FIG. 10, to realize this hardware as an LSI, there are provided a switch 45 to bypass the section of the track distributor 40 and a switch 46 to lead the even-numbered encoding outputs to the recording circuits regarding even-numbered heads 20T2, 20T4, . . . of the tape recorder having the twenty tracks. When the tape recorder having the 20 tracks operates in the 2M mode in which the time-sharing multiplexing is not needed, the switches 45 and 46 are connected.

What is claimed is:

1. A method of recording a digital information signal in which a digital information signal is recorded on a plurality of parallel tracks which are formed in the longitudinal direction of a recording medium, comprising the steps of:

separating a time series of said digital information signal into a plurality of even-numbered words and a plurality of odd-numbered words; specifying in a manner such that said plurality of even-numbered and said plurality of odd-numbered words are respectively recorded on a first track group and a second track group which are separated with respect to the widthwise direction of said recording medium; and performing an error correction coding process with regard to each of said plurality of even-numbered words and said plurality of odd-numbered words.

2. An apparatus for recording a digital information signal in which a digital information signal is recorded on a plurality of parallel tracks which are formed in the longitudinal direction of a recording medium, comprising:

means for separating a time series of said digital information signal into a plurality of even-numbered words and a plurality of odd-numbered words; means for specifying in a manner such that said plurality of even-numbered words and said plurality of odd-numbered words are respectively recorded on a first track group and a second track group which are separated with respect to the widthwise direction of said recording medium; and means for performing an error correction coding process with regard to each of said plurality of even-numbered words and said plurality of odd-numbered words.

3. A method of recording a digital information signal in which a digital information signal is recorded on n parallel tracks which are formed in the longitudinal direction of a recording medium, comprising:

an encoding step of performing error correction coding processes with respect to an input digital information signal and forming data to be distributed onto 2n tracks; and a time-shared multiplexing step of receiving outputs in said encoding step and converting said outputs to data to be recorded on said n tracks.

4. An apparatus for recording a digital information signal in which a digital information signal is recorded on n parallel tracks which are formed in the longitudinal direction of a recording medium, comprising:

encoding means for performing error correction coding processes with respect to an input digital information signal and forming data to be distributed onto 2n tracks; and time-shared multiplexing means for receiving outputs of said encoding means and converting said outputs to data to be recorded on said n tracks.

5. A method of recording a digital information signal in which one word of a digital information signal is divided into a plurality of symbols and is recorded on a recording medium in a plurality of parallel, longitudinal tracks, comprising the steps of:

performing an error correction coding process using said symbol as a unit; and specifying said symbols such that said plurality of symbols constituting one word of said digital information signal are recorded at positions having a strong error correlation in a widthwise direction of the record medium and in a longitudinal direction of the record medium.

6. An apparatus for recording a digital information signal in which one word of a digital information signal is divided into a plurality of symbols and is recorded on a recording medium in a plurality of parallel, longitudinal tracks, comprising:

means for performing an error correction coding process using said symbols as a unit; and means for specifying said symbols such that said plurality of symbols constituting one word of said digital information signal are recorded at positions having a strong error correlation in a widthwise direction on said record medium and in a longitudinal direction on said record medium.

* * * * *